United States Patent Office 3,347,640
Patented Oct. 17, 1967

3,347,640
MAGNESIA-ALUMINA BUFFER COMPOSITIONS
Takeru Higuchi, Madison, Wis., and Foo Song Hom, Detroit, Mich., assignors to Warner-Lambert Pharmaceutical Company, Morris Plains, N.J., a corporation of Delaware
No Drawing. Filed Mar. 22, 1963, Ser. No. 267,330
5 Claims. (Cl. 23—315)

This invention relates to novel buffer compositions. More particularly this invention relates to novel buffer compositions which are capable of neutralizing large quantities of acid rapidly without significant change in pH, and which are useful in the treatment of gastric hyperacidity.

The novel compositions of this invention are hydrated materials having approximately the composition, exclusive of water of hydration, represented by the formula $3MgO \cdot Al_2O_3 \cdot SO_3$.

It is believed that the novel compositions of this invention are in fact novel pure compounds having the formula, exclusive of water of hydration, $3MgO \cdot Al_2O_3 \cdot SO_3$, and that these compounds have no differences in composition other than the differing amounts of water of hydration.

The novel compositions of this invention can be prepared by mixing an alkali metal aluminate with a source of magnesium ions and a source of sulfate ions in an aqueous solution which is buffered with a weak base and a strong acid to a pH in the range of about 7.0 to about 9.5. Best results are obtained when the pH of the solution is from 7.0 to 8.5, for a coprecipitate of

$4MgO \cdot Al_2O_3 \cdot SO_3$ forms when the pH exceeds 8.5.

The aluminum compound may be any water soluble alkali metal aluminate, but sodium aluminate and potassium aluminate are preferred because of their greater availability and lower cost. The formula of sodium aluminate may be represented as $NaAl(OH)_4$. Aluminate solutions containing various amounts of free alkali may be satisfactorily used. The magnesium compound may be any water soluble magnesium salt, such as magnesium sulfate, magnesium acetate, magnesium chloride, or magnesium nitrate. Magnesium sulfate, which is readily available as the heptahydrate and commonly called Epsom salts, is the preferred magnesium salt because of its availability and low cost. This salt serves both as a source of magnesium ions and a source of sulfate ions. The large excess of sulfate ions over the amount required has no deleterious effects. Insoluble magnesium compounds such as magnesium hydroxide and magnesium carbonate may also be used. Such compounds may require partial neutralization with acid to bring the pH within the permissible range.

When a magnesium salt other than magnesium sulfate is used, it is necessary to add an additional compound to serve as a source of sulfate ions. This source of sulfate ions should be water soluble, and is preferably an alkali metal sulfate such as sodium sulfate or potassium sulfate. Sulphuric acid may be used to furnish all or part of the sulfate ions, provided the quantity added does not reduce the pH below about 7.

The buffer used in the present invention is preferably a combination of a weak base and a strong acid in amounts to give a solution pH in the range of about 7.0 to about 9.5. As already stated, it is preferred that the pH of the solution not be in excess of 8.5, for at a higher pH there is a coprecipitate containing two atoms of magnesium per atom of aluminum and believed to have the formula $4MgO \cdot Al_2O_3 \cdot SO_3$ exclusive of water of hydration. Especially suitable weak bases are ammonia and organic amines sufficiently strong to give the required pH, e.g., tris(hydroxymethyl) aminomethane, ethanolamine, diethanolamine, methylamine, and the like. The acid may be strong or moderately strong acid such as hydrochloric acid, nitric acid, acetic acid, or the like. Various buffer combinations, for example, include ammonium hydroxide-hydrochloric acid and tris(hydroxymethyl)aminomethane-hydrochloric acid.

The concentration of the buffer has been found to be important. When using either of the preferred buffer combinations of this invention, i.e., ammonium hydroxide - hydrochloric acid or tris(hydroxymethyl)aminomethane - hydrochloric acid, the concentration of ammonium hydroxide in solution should not be less than 0.01 mol per liter. Higher ammonium hydroxide concentrations are preferred. For example, excellent results are obtained when the ammonium hydroxide concentration is 0.05 mol per liter. The suitable concentrations of tris (hydroxymethyl)aminomethane are about the same as the suitable concentrations of ammonia. The presence of this buffer combination results in the formation of the desired precipitate $3MgO \cdot Al_2O_3 \cdot SO_3$. If the concentration of ammonium hydroxide drops below the minimum of 0.01 mol per liter, however, the desired compound does not precipitate in pure form and instead there is formed a substantial amount of $4MgO \cdot Al_2O_3 \cdot SO_3$. As the buffer concentration becomes less and less, the amount of undesired product becomes greater and the amount of desired product less and less, so that in a solution containing no buffer, the precipitate consists entirely of the unwanted $4MgO \cdot Al_2O_3 \cdot SO_3 \cdot yH_2O$ and none of the desired $3MgO \cdot Al_2O_3 \cdot SO_3 \cdot xH_2O$.

The atomic ratio of magnesium to aluminum in the reagents should be at least about 2:1. Best results are obtained when the ratio is at least 2.5:1. The atomic ratio of magnesium to aluminum may be as high as desired, for in a solution buffered as above described, the desired precipitate which contains 1.5 atoms of magnesium for every atom of aluminum, is always the precipitate which is formed, regardless of how high the ratio of magnesium to aluminum in the reagents is. The atomic ratio of sulfur to aluminum is desirably kept at a value of about 1:2 or greater. Preferably there is at least a 20% excess of sulfur compound. This sulfur compound can be present in large excess, for the desired precipitate containing one atom of sulfur for every two atoms of aluminum is formed even though the atomic ratio of sulfur to aluminum in the reagents is much higher than 1:2.

The absolute concentrations of reagents may be varied over wide limits. The atomic ratio of magnesium to aluminum should be at least 2:1, but the absolute concentrations of both can vary widely.

The precipitate may be readily recovered by conventional means such as centrifugation or filtration, followed by washing and drying.

The novel product of this invention is a superior antacid for the treatment of gastric hyperacidity. It is characterized by a high acid consuming power per unit weight, a buffer pH of about 4.0, which is preferred in antacid compositions and the capacity to neutralize excess acid very rapidly to the buffer pH and at the same time not to create an undesirably high pH when no acid is present. The latter is important for it enables the user to take the antacid composition safely without creating an undesirably high pH in the stomach in the event no acid is released, and at the same time to take up large quantities of acid and not to cause acid rebound. The compositions of this invention have a long shelf-life with little or no loss of acid consuming power with time.

The invention will now be described with reference to the specific embodiments as illustrated by the following examples.

Example 1

To a solution of 0.40 gram (0.0042 mol) of magnesium chloride, $MgCl_2$, in one liter of water, are added 4 ml. of 1 N acetic acid solution, 25 ml. of 3 N hydrochloric acid solution, 5 ml. of 1 M sodium sulfate, and 4 ml. of 3 N ammonium hydroxide solution. To this mixture is added with rapid stirring 10 ml. of 0.18 M sodium aluminate solution containing approximately 20% excess sodium hydroxide. The resulting slurry is agitated 48 hours, allowed to settle, and the supernatant liquid decanted. The solid product is recovered as a wet paste by centrifuging, and is dried over concentrated sulfuric acid in a desiccator. This product has the composition $3MgO \cdot Al_2O_3 \cdot SO_3$, exclusive of water of hydration.

Example 2

To a solution of 10 grams (0.0425 mol) of Epsom salt, $MgSO_4 \cdot 7H_2O$, in one liter of water, are added 40 ml. of 1 N aqueous acetic acid; 2.5 ml. of 3 N aqueous hydrochloric acid, and 14.5 grams of tris(hydroxymethyl)aminomethane. To this solution is added with rapid stirring 100 ml. of 0.18 M aqueous sodium aluminate solution containing approximately 20% excess sodium hydroxide (NaOH=0.04 M). The resulting slurry is agitated 24 hours at 45° C. and then allowed to settle, and the supernatant liquid is decanted. The solid is recovered as a wet paste by centrifuging, and dried over concentrated sulfuric acid in a desiccator.

While we have described our invention with reference to specific embodiments thereof, it is understood that the scope of this invention is limited only by the appended claims.

We claim:

1. Compounds having the formula $3MgO \cdot Al_2O_3 \cdot SO_3$ plus water of hydration.
2. A process for preparing the compound having the formula $3MgO \cdot Al_2O_3 \cdot SO_3$ plus water of hydration, which comprises mixing an alkali metal aluminate, a source of magnesium ions and a source of sulfate ions in an aqueous solution buffered to a pH in the range of about 7.0 to about 8.5 and recovering the resulting precipitate.
3. The process of claim 2 wherein the pH of said solution is 7.0 to 8.5.
4. The process of claim 2 wherein said aqueous solution is buffered with ammonium hydroxide and a strong acid.
5. The process of claim 2 wherein said aqueous solution is buffered with tris(hydroxymethyl)aminomethane and a strong acid.

References Cited

UNITED STATES PATENTS

| 1,914,178 | 6/1933 | Steuart | 23—123 |
| 2,413,184 | 12/1946 | La Lande | 23—52 |

FOREIGN PATENTS

| 239,547 | 6/1962 | Australia. |

OTHER REFERENCES

Hoffmann: "Lexikon der Anorganische Verbindungen," vol. 2, p. 13 (1914).

MILTON WEISSMAN, *Primary Examiner.*